(12) United States Patent
Stahl

(10) Patent No.: US 6,863,338 B2
(45) Date of Patent: Mar. 8, 2005

(54) BODY STRUCTURE FOR A MOTOR VEHICLE AND METHOD OF MAKING SAME

(75) Inventor: Rainer Stahl, Sersheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/644,059

(22) Filed: Aug. 20, 2003

(65) Prior Publication Data

US 2004/0124666 A1 Jul. 1, 2004

(30) Foreign Application Priority Data

Aug. 20, 2002 (DE) .......................... 102 37 962

(51) Int. Cl.⁷ .................................................. B60J 7/00
(52) U.S. Cl. .............. 296/187.02; 296/188; 296/193.06
(58) Field of Search ............................ 296/187.02, 204, 296/193.07, 63, 187.09, 187, 188, 187.03, 193.06, 75, 100.02, 100.06, 100.07, 100.08, 100.09, 100.17, 104, 136.02, 136.03

(56) References Cited

U.S. PATENT DOCUMENTS

| | | | | | |
|---|---|---|---|---|---|
| 3,420,570 | A | * | 1/1969 | Kunz ..................... | 296/100.06 |
| 4,615,557 | A | * | 10/1986 | Robinson ................ | 296/100.07 |
| 4,824,162 | A | * | 4/1989 | Geisler et al. ......... | 296/100.09 |
| 4,861,092 | A | * | 8/1989 | Bogard ................... | 296/100.09 |
| 5,009,457 | A | * | 4/1991 | Hall ....................... | 296/100.07 |
| 5,183,309 | A | * | 2/1993 | Jordan ................... | 296/100.07 |
| 5,460,423 | A | * | 10/1995 | Kersting et al. ....... | 296/100.18 |
| 5,564,773 | A | * | 10/1996 | Lapsley et al. ......... | 296/100.06 |
| 5,700,049 | A | * | 12/1997 | Shibata .................. | 296/187.09 |
| 5,857,729 | A | * | 1/1999 | Bogard ................... | 296/100.09 |
| 6,053,557 | A | * | 4/2000 | Kooiker ................. | 296/100.06 |
| 6,059,350 | A | * | 5/2000 | Kooiker ................. | 296/100.09 |
| 6,076,881 | A | * | 6/2000 | Tucker ................... | 296/100.07 |
| 6,082,806 | A | * | 7/2000 | Bogard ................... | 296/100.06 |
| 6,092,864 | A | * | 7/2000 | Wycech et al. ........ | 296/187.02 |
| 6,096,403 | A | * | 8/2000 | Wycech ................. | 296/187.02 |
| 6,135,542 | A | * | 10/2000 | Emmelmann et al. . | 296/187.02 |
| 6,170,900 | B1 | * | 1/2001 | Kooiker ................. | 296/107.09 |
| 6,176,541 | B1 | * | 1/2001 | Hoff ....................... | 296/100.09 |
| 6,199,940 | B1 | * | 3/2001 | Hopton et al. ......... | 296/187.02 |
| 6,224,133 | B1 | * | 5/2001 | Abramoski et al. ........... 296/75 |
| 6,227,602 | B1 | * | 5/2001 | Bogard ................... | 296/100.06 |
| 6,234,559 | B1 | * | 5/2001 | Block et al. ........... | 296/100.06 |
| 6,250,410 | B1 | * | 6/2001 | Balestrini et al. ...... | 296/193.07 |
| 6,287,666 | B1 | * | 9/2001 | Wycech ................. | 296/187.02 |
| 6,305,136 | B1 | * | 10/2001 | Hopton et al. ......... | 296/187.02 |
| 6,338,520 | B2 | * | 1/2002 | Rusu et al. ............. | 296/100.07 |
| 6,341,467 | B1 | * | 1/2002 | Wycech ................. | 296/193.06 |
| 6,378,933 | B1 | * | 4/2002 | Schoen et al. ......... | 296/187.02 |
| 6,382,699 | B1 | * | 5/2002 | Hanson ................. | 296/100.09 |
| 6,419,305 | B1 | * | 7/2002 | Larsen ................... | 296/187.02 |
| 6,439,639 | B1 | * | 8/2002 | Branting ............... | 296/100.09 |
| 6,455,144 | B1 | * | 9/2002 | Wycech ................. | 296/193.06 |
| 6,467,834 | B1 | * | 10/2002 | Barz et al. ............. | 296/187.02 |
| 6,497,445 | B1 | * | 12/2002 | Combs, II .............. | 296/100.07 |
| 6,533,344 | B1 | * | 3/2003 | Patterson ............... | 296/100.06 |
| 6,634,691 | B2 | * | 10/2003 | Henderson ............. | 296/100.06 |
| 6,641,200 | B2 | * | 11/2003 | Rusu ..................... | 296/100.07 |
| 6,663,160 | B2 | * | 12/2003 | Yarbrough et al. .... | 296/100.06 |

(List continued on next page.)

*Primary Examiner*—Kiran Patel
(74) *Attorney, Agent, or Firm*—Crowell & Moring LLP

(57) ABSTRACT

So that intake water cannot flow from a frame side member of the body structure by way of a seat cross member into an exterior side member of the vehicle, a so-called partition part is arranged between the frame side member and the seat cross member, which partition part comprises a basic part and an expansion foam arranged thereon. As a result of the effect of heat, the expansion foam can expand to such an extent that the passage surface in the seat cross member is closed off in a watertight fashion and water can no longer enter the cross member.

7 Claims, 2 Drawing Sheets

U.S. PATENT DOCUMENTS

| | | | |
|---|---|---|---|
| 6,729,425 B2 * | 5/2004 | Schneider et al. | 296/187.02 |
| 6,786,533 B2 * | 9/2004 | Bock et al. | 296/187.02 |
| 6,793,274 B2 * | 9/2004 | Riley et al. | 296/187.03 |
| 2001/0020794 A1 * | 9/2001 | Ishikawa | 296/188 |
| 2001/0042353 A1 * | 11/2001 | Honda et al. | 296/188 |
| 2001/0050494 A1 * | 12/2001 | Rusu et al. | 296/100.07 |
| 2002/0125739 A1 * | 9/2002 | Czaplicki et al. | 296/187 |
| 2003/0184121 A1 * | 10/2003 | Czaplicki et al. | 296/187.02 |
| 2004/0104598 A1 * | 6/2004 | Barz et al. | 296/187.02 |
| 2004/0124666 A1 * | 7/2004 | Stahl | 296/187.02 |

* cited by examiner

BODY STRUCTURE FOR A MOTOR VEHICLE AND METHOD OF MAKING SAME

BACKGROUND AND SUMMARY OF THE INVENTION

This application claims the priority of German Application No. 102 37 962.9 filed Aug. 20, 2002, the disclosure of which is expressly incorporated by reference herein.

The invention relates to a body structure for a motor vehicle. Preferred embodiments of the invention relate to a motor vehicle body structure assembly including a seat cross-member which is arranged to extend transversely with respect to, and be connected with, a frame side member and exterior side members, the frame side member comprising a U-profile with bent-away sections which are constructed as a top-side support for the seat cross member, the seat cross member comprising a U-profile connected in each case on a facing side with the frame side member.

In the case of vehicles, particularly cross-country vehicles, it is problematic that, by way of the frame side member of the body structure, water may enter an exterior side member by way of a seat cross member.

It is an object of the invention to provide a body structure, particularly a sealing in the body structure, which prevents a water intake into the lateral exterior side member of the vehicle.

According to preferred embodiments of the invention, in the case of a body structure the above-mentioned type, this object is achieved by providing a body structure for a motor vehicle, having a seat cross-member which is arranged to extend transversely with respect to, and be connected with, a frame side member and exterior side members, the frame side member comprising a U-profile with bent-away sections which are constructed as a top-side support for the seat cross member, the seat cross member comprising a U-profile connected in each case on a facing side with the frame side member, wherein a partition part is arranged between a bent-away section of the frame side member which faces the side member, and wherein the partition part in a watertight manner closes off a passage surface formed by the bent-away section and the U-profile of the seat cross member.

Important advantages achieved by means of the invention are that, by means of a so-called partition part, a sealing-off is provided against an intake of water into the side member. This partition part is arranged between a bent-away section of the frame side member, which faces the side member, and the seat cross-member. By means of the partition part, the passage surface of the bent-away section of the frame side member and of the U-profile of the seat cross-member is closed off in a watertight manner.

In the installed condition, the partition part is arranged in a vertical plane and comprises a basic member with a surrounding expansion foam which is arranged in a spaced manner in the passage surface. This expansion foam surrounds the basic member, and, after the fastening, for example, by way of a snap-type connection, as a result of heat or the like, the foam can expand to such an extent that the passage surface in the seat cross member is closed off in a watertight manner with respect to the lateral side member.

Other objects, advantages and novel features of the present invention will become apparent from the following detailed description of the invention when considered in conjunction with the accompanying drawings.

DETAILED DESCRIPTION OF THE DRAWINGS

Figure 1:
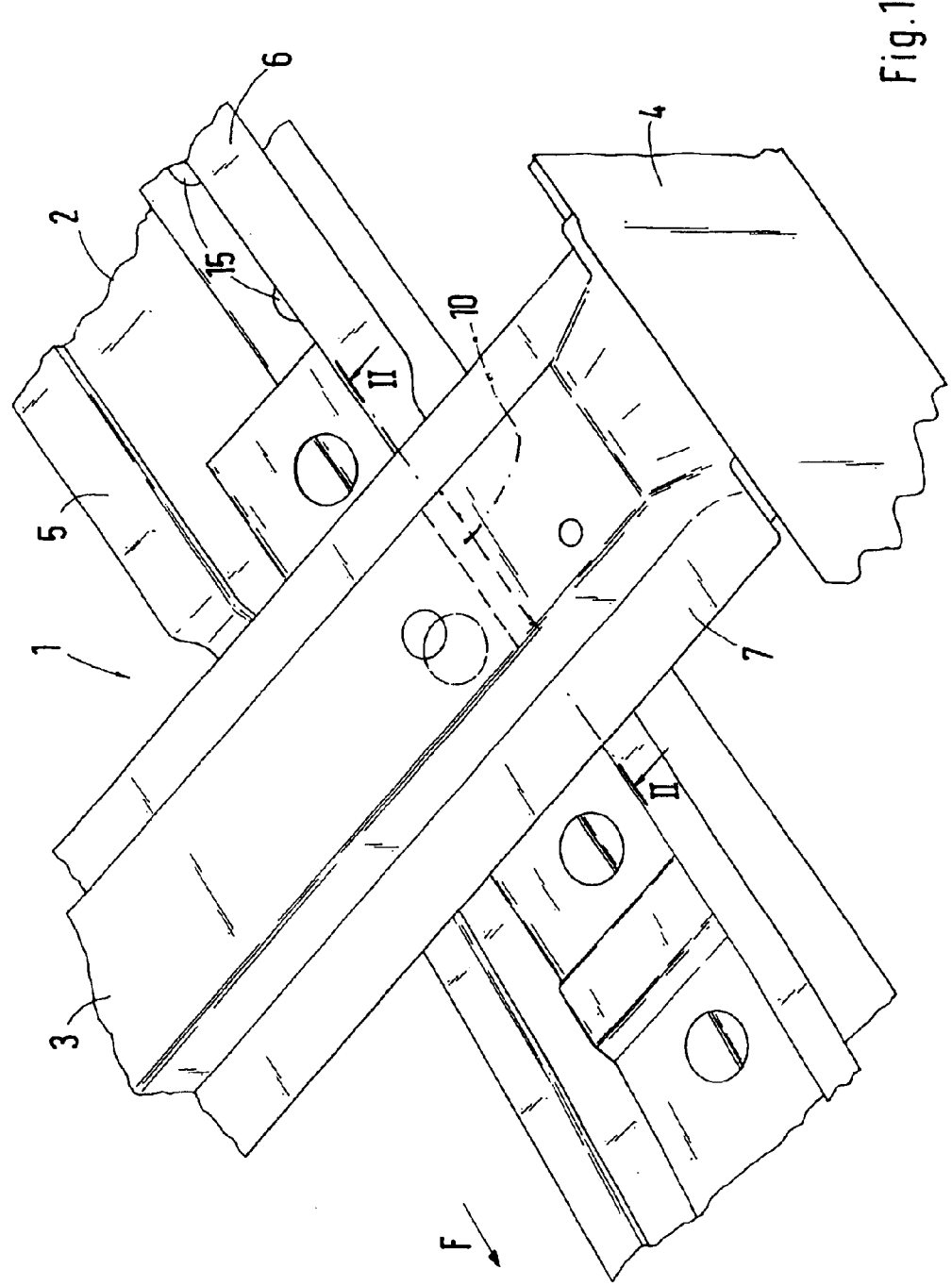
FIG. 1 is a diagrammatic representation of a part of a frame side member of a vehicle body structure constructed according to a preferred embodiment of the invention, with a seat cross member arranged above the side member, which seat cross member is connected on an end side with a lateral side member.

FIG. 1 shows, as part of a vehicle structure, a part of a frame side member 2 with a part of a seat cross member 3 and a part of a lateral side member 4 of a vehicle. Viewed in the driving direction F, the left side of the vehicle body structure 1 is shown.

The frame side member 2 comprises essentially a U-profile with bent-away sections 5 and 6 on which the seat cross member 3 is supported. This seat cross member 3 includes an upper and a lower U-profile 7 and 8 whose bent-away sections 7a, 7b and 8c, 8d are disposed on one another, which is illustrated in detail in FIG. 2. In FIG. 1, the bottom U-profile 8 of the seat cross member 3 is not shown.

Between the bent-away section 6 of the frame side member 2 and the U-profile 7 of the seat cross member 3 situated on top, a partition part 10 is arranged which is connected by means of clips 11, 12 with the bent-away section 6 of the frame side member 2.

Figure 2:
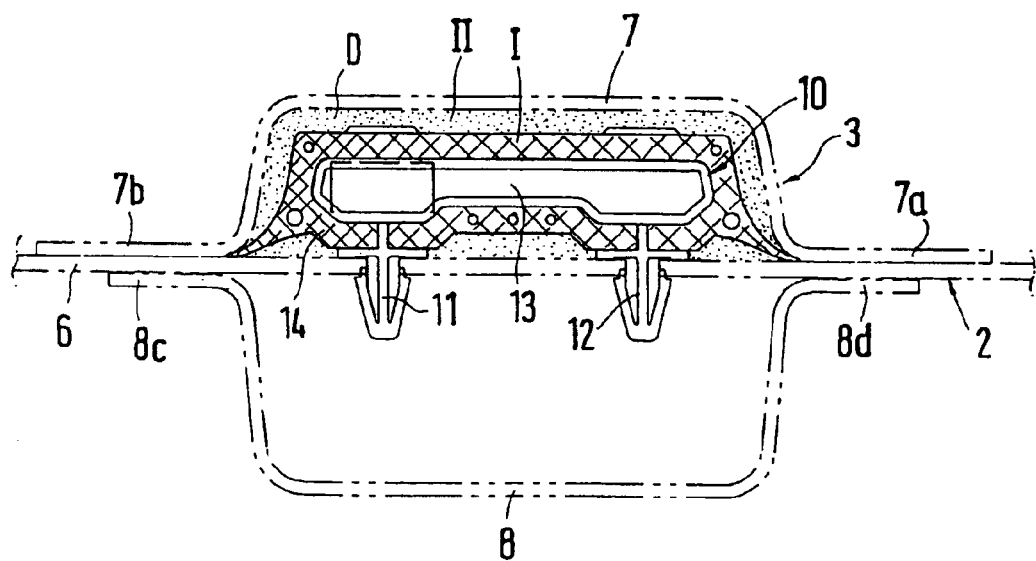
FIG. 2 is a sectional view taken along the plane of Line II—II of FIG. 1, showing the seat cross member and the frame side member.

This partition part 10 comprises a basic member 13 which is surrounded by an expanding foam part 14. This foam part 14 is illustrated in FIG. 2 in the inserted condition I (crossed lines). In the expanded condition II (spotted surface), the foam places itself directly onto the interior wall of the profile 7 of the seat cross member 3 and the surface of the bent-away section 6 of the frame side member 2, so that the passage surface D is tightly closed off on all sides, and therefore no more water can flow from the frame side member 2 into the side member 4. The water intake into the frame side member 2 may take place by way of the openings 15 and, from there, by way of the seat cross member 3 through the welds into the side member 4.

The foamed part 14 is caused to expand by the effect of heat, and it is ensured that the sealing in condition II is absolutely watertight and durable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Body structure for a motor vehicle, having a seat cross-member which is arranged to extend transversely with respect to, and be connected with, a frame side member and exterior side members, the frame side member comprising a U-profile with bent-away sections which are constructed as a top-side support for the seat cross member, the seat cross member comprising a U-profile connected in each case on a facing side with the frame side member, wherein a partition part is arranged between a bent-away section of the frame side member which faces the side member, and wherein the partition part in a watertight manner closes off a passage surface formed by the bent-away section and the U-profile of the seat cross member.

2. Body structure according to claim 1, wherein, in an installed condition, the partition part is constructed with a basic member arranged in a vertical plane and a surrounding expansion foam which is arranged at a spacing from passage surfaces of the frame side member and the seat cross member.

3. Body structure according to claim 1, wherein the passage surfaces in an end installed condition, are sealingly filled on all sides with the expansion foam.

4. Body structure according to claim 1, wherein the basic support is connected with the bent-away section of the frame side member profile by way of fastening elements.

5. Body structure according to claim 4, wherein the fastening elements are clips.

6. Body structure according to claim 3, wherein the basic support is connected with the bent-away section of the frame side member profile by way of fastening elements.

7. Body structure according to claim 6, wherein the fastening elements are clips.

* * * * *